US012300175B2

(12) United States Patent
Ito

(10) Patent No.: US 12,300,175 B2
(45) Date of Patent: May 13, 2025

(54) LIGHT EMITTING APPARATUS, AND DISPLAY APPARATUS AND ELECTRONIC DEVICE INCLUDING SAME

(71) Applicant: CANON KABUSHIKI KAISHA, Tokyo (JP)

(72) Inventor: Kentaro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/347,116

(22) Filed: Jul. 5, 2023

(65) Prior Publication Data

US 2024/0013719 A1 Jan. 11, 2024

(30) Foreign Application Priority Data

Jul. 6, 2022 (JP) ................................ 2022-108938
May 29, 2023 (JP) ................................ 2023-087972

(51) Int. Cl.
*G09G 3/3233* (2016.01)
*G09G 3/00* (2006.01)

(52) U.S. Cl.
CPC .......... *G09G 3/3233* (2013.01); *G09G 3/035* (2020.08); *G09G 2300/0842* (2013.01); *G09G 2300/0861* (2013.01); *G09G 2310/08* (2013.01); *G09G 2320/0233* (2013.01);
(Continued)

(58) Field of Classification Search
CPC ................ G09G 3/3233; G09G 3/035; G09G 2300/0842; G09G 2300/0861; G09G 2310/08; G09G 2320/0233; G09G 2320/0626; G09G 2320/0686; G09G 2354/00; G09G 2360/144; G09G 2360/145; G09G 2320/048; G09G 3/3208;
(Continued)

(56) References Cited

U.S. PATENT DOCUMENTS 5,761,543 A 6/1998 Yamada
6,041,184 A 3/2000 Inoue
6,091,910 A 7/2000 Mihara
(Continued)

FOREIGN PATENT DOCUMENTS

DE 10113248 A1 10/2002
EP 3264738 A 1/2018
(Continued)

*Primary Examiner* — Sahlu Okebato
(74) *Attorney, Agent, or Firm* — Canon U.S.A., Inc. IP Division

(57) ABSTRACT

A light emitting apparatus having a first light emitting region and a second light emitting region, the second light emitting region including the first light emitting region and having a larger area than that of the first light emitting region, a first light emitting element being included in the first light emitting region, a second light emitting element being not included in the first light emitting region but included in the second light emitting region, the light emitting apparatus having a first emission mode where only the first light emitting region emits light and a second emission mode where the second light emitting region emits light, the light emitting apparatus includes a control unit configured to, in the second emission mode, control a difference between an amount of light emitted by the first light emitting element and an amount of light emitted by the second light emitting element.

21 Claims, 7 Drawing Sheets

(52) U.S. Cl.
CPC ............... *G09G 2320/0626* (2013.01); *G09G 2320/0686* (2013.01); *G09G 2354/00* (2013.01)

(58) Field of Classification Search
CPC ............... G09G 3/006; G09G 2330/12; G09G 2360/14; G09G 2360/16; G09G 2370/00
See application file for complete search history.

(56) References Cited

U.S. PATENT DOCUMENTS

| | | | | |
|---|---|---|---|---|
| 11,079,995 | B1 * | 8/2021 | Hulbert | G06F 3/04845 |
| 2003/0030613 | A1 * | 2/2003 | Chae | G09G 3/3666 345/89 |
| 2006/0055710 | A1 * | 3/2006 | Lo | G09G 5/14 345/629 |
| 2006/0087588 | A1 | 4/2006 | Cok | |
| 2009/0110387 | A1 | 4/2009 | Fujii | |
| 2014/0111567 | A1 | 4/2014 | Nathan | |
| 2014/0179380 | A1 | 6/2014 | Roh | |
| 2015/0009313 | A1 | 1/2015 | Noda | |
| 2016/0284272 | A1 * | 9/2016 | Her | G09G 3/035 |
| 2017/0098403 | A1 | 4/2017 | Chung | |
| 2018/0247985 | A1 * | 8/2018 | Jeon | H10K 59/353 |

FOREIGN PATENT DOCUMENTS

| | | | |
|---|---|---|---|
| JP | H06138369 | A | 5/1994 |
| JP | H07299038 | A | 11/1995 |
| JP | 2014010448 | A | 1/2014 |
| JP | 2015038606 | A | 2/2015 |
| JP | 2022001954 | A | 1/2022 |
| KR | 20160114246 | A | 10/2016 |
| WO | 2004090487 | A1 | 10/2004 |

* cited by examiner

LIGHT EMITTING APPARATUS, AND DISPLAY APPARATUS AND ELECTRONIC DEVICE INCLUDING SAME

BACKGROUND OF THE INVENTION

Field of the Invention

The present invention relates to a light emitting apparatus, and a display apparatus and an electronic device including the same.

Description of the Related Art

Various light emitting elements have been developed in recent years, and techniques for arranging such light emitting elements in a matrix to constitute a display apparatus have been known. Various devices for displaying images have been developed depending on the performance of the light emitting elements, and a variety of apparatuses have been developed for their use purposes. Of these, some display apparatuses are known to provide different areas of display depending on a use condition. One example is a foldable display.

Japanese Patent Application Laid-Open No. 2015-038606 discusses a technique related to determination of a display region of a foldable display based on a difference between when the foldable display is folded and when unfolded in use.

The display apparatus discussed in Japanese Patent Application Laid-Open No. 2015-038606 changes the size of its display region but is unable to compensate for a discrepancy in the time of use between the display regions. The display apparatus thus causes a difference in luminance degradation between the display regions due to the different times of use.

SUMMARY OF THE INVENTION

The present invention is directed to providing a light emitting apparatus having a variable light-emitting region with a reduced difference in luminance degradation between display regions.

According to an aspect of the present invention, a light emitting apparatus having a first light emitting region and a second light emitting region, the second light emitting region including the first light emitting region and having a larger area than that of the first light emitting region, a first light emitting element being included in the first light emitting region, a second light emitting element being not included in the first light emitting region but included in the second light emitting region, the light emitting apparatus having a first emission mode where only the first light emitting region emits light and a second emission mode where the second light emitting region emits light, the light emitting apparatus includes a control unit configured to, in the second emission mode, control a difference between an amount of light emitted by the first light emitting element and an amount of light emitted by the second light emitting element.

Further features of the present invention will become apparent from the following description of embodiments with reference to the attached drawings.

DESCRIPTION OF THE EMBODIMENTS

Figure 1A:
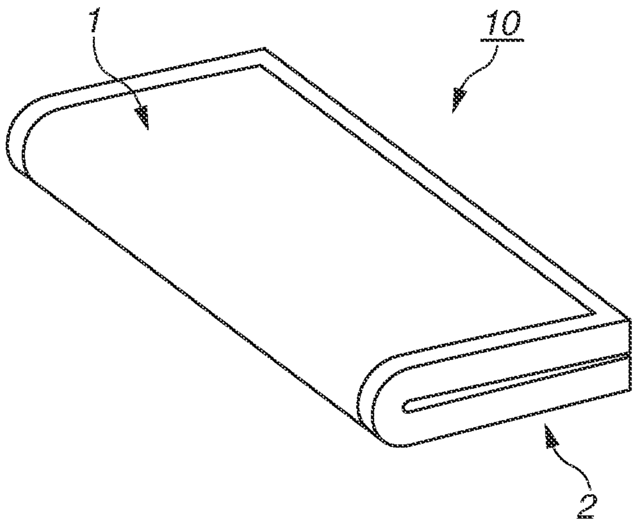
FIG. 1A is a schematic diagram illustrating an example of a first emission mode of a light emitting apparatus according to an embodiment of the present invention.

According to an aspect of the present invention, a light emitting apparatus having a first light emitting region and a second light emitting region, the second light emitting region including the first light emitting region and having a larger area than that of the first light emitting region, a first light emitting element being included in the first light emitting region, a second light emitting element being not included in the first light emitting region but included in the second light emitting region, the light emitting apparatus having a first emission mode where only the first light emitting region emits light and a second emission mode where the second light emitting region emits light, the light emitting apparatus includes a control unit configured to, in the second emission mode, control a difference between an amount of light emitted by the first light emitting element and an amount of light emitted by the second light emitting element.

A light emitting apparatus according to an embodiment of the present invention includes a first light emitting region and a second light emitting region, the second light emitting region including the first light emitting region and having a larger area than that of the first light emitting region. For example, if the display apparatus is a foldable display apparatus that can be folded with its display surface facing outside, one of the sides of the display apparatus folded is the first light emitting region. The entire surface of the display apparatus unfolded is the second light emitting region. Alternatively, a part of the display surface of the display apparatus is the first light emitting region, and the entire surface including the part is the second light emitting region. A light emitting apparatus according to an embodiment of the present invention may comprise a detection unit configured to detect orientation of the light emitting apparatus. The light emitting apparatus may have a first emission mode where only the first light emitting region emits light and a second emission mode where the second light emitting region emits light. The first emission mode and the second emission mode are switched based on a signal from the detection unit.

The first light emitting region includes first light emitting elements. A region of the second light emitting region other than the first light emitting region includes second light emitting elements. The first and second light emitting elements may be current-driven elements. The current-driven elements can decrease in emission luminance with driving time, and a difference in luminance between the first light emitting elements and the second light emitting elements can be large. In other words, a control unit that reduces the difference in luminance according to the present embodiment is effective for the current-driven elements.

The light emitting elements used in the embodiment of the present invention may be organic light emitting elements. The organic light emitting elements can decrease in emission luminance with emission time. If the light emitting elements used in the first and second light emitting regions are organic light emitting elements, the control unit according to the embodiment of the present invention is thus effective since the first and second light emitting regions are likely to be different in luminance.

The control unit according to the embodiment of the present invention detects a difference in the amount of light between the first and second light emitting elements, and controls the amounts of light of the respective light emitting elements to reduce the difference. The amounts of light may be adjusted by adjustment of luminance or adjustment of emission time. Both of the parameters may be adjusted, and other parameters may be adjusted as well.

The control unit according to the embodiment of the present invention may detect voltages of the first and second light emitting elements in passing a certain current therethrough, and estimate degradation. More specifically, the control unit that reduces the difference in the amount of light emission may include a current measurement unit that obtains a first current value when the first light emitting elements emit light at first emission luminance and a second current value when the second light emitting elements emit light at the first emission luminance. The control unit may reduce the difference in the amount of light emission between the first and second light emitting elements based on information from the current measurement unit, or more specifically, the first current value and the second current value.

Degradation may be estimated by the control unit measuring luminance in passing a certain current through the first and second light emitting elements. To measure the luminance, light receiving elements may be added. The light receiving elements may be built in a circuit that drives the light emitting elements. A circuit including the light receiving elements may be provided aside from the driving circuit of the light emitting elements. An image signal may be generated based on signals from the light receiving elements. A driving circuit capable of adjusting the voltages applied to the light emitting elements based on the signals from the light receiving elements may be used. In other words, the control unit that reduces the difference in the amount of light emission may further include a light receiving unit, and reduce the difference in the amount of light between the first and second light emitting elements based on information from the light receiving unit.

The control unit may generate an image signal based on a signal from the light receiving unit, and reduce the difference in the amount of light between the first and second light emitting elements. Alternatively, the control unit may increase or decrease the voltage applied to the first light emitting elements or the second light emitting elements based on the signal from the light receiving unit. In other words, the difference in the amount of light can be adjusted by an action made on transistors of the light emitting elements without generation of an image signal from the signal from the light receiving unit.

The degradation of the first and second light emitting elements may be estimated from the total lengths of time of light emission by the respective first and second light emitting elements. The method for estimating degradation from time may use a table of time and degrees of degradation.

More specifically, the control unit that reduces the difference in the amount of light may further include time measurement units that measure the cumulative times of light emission, and reduce the difference in the amount of light emission between the first and second light emitting elements based on information from the respective time measurement units.

The control unit that reduces the difference in the amount of light emission according to the embodiment of the present invention may increase or decrease the luminance of the first light emitting elements or that of the second light emitting elements. The control unit that reduces the difference in the amount of light between the first and second light emitting elements may increase or decrease the emission time of the first light emitting elements or that of the second light emitting elements.

Figure 1B:
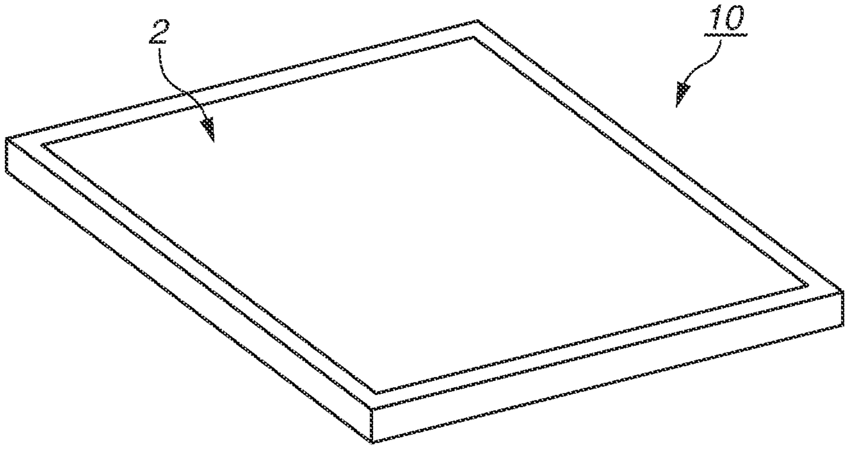
FIG. 1B is a schematic diagram illustrating an example of a second emission mode of the light emitting apparatus according to the embodiment of the present invention.

FIGS. 1A and 1B are schematic diagrams illustrating a light emitting apparatus according to a first embodiment of the present invention. FIG. 1A illustrates a state where the light emitting apparatus according to the present embodiment is folded. A light emitting apparatus 10 includes a first light emitting region 1, and a second light emitting region 2 that includes the first light emitting region 1 and has a larger area than that of the first light emitting region 1. The first light emitting region 1 includes first light emitting elements. A region of the second light emitting region 2 other than the first light emitting region 1 includes second light emitting elements. FIG. 1A illustrates a first emission mode where only the first light emitting region 1 emits light.

In the first emission mode, the second light emitting elements do not emit light.

The first light emitting elements emit light in both the first emission mode and a second emission mode. By contrast, the second light emitting elements emit light only in the second emission mode. This causes a difference in the time of light emission. The difference in the time of light emission can cause a difference between the amounts of decrease in the respective amounts of light. FIG. 1B illustrates the second emission mode, where the first and second light emitting elements form a single image, and there can be a difference in the amount of light within the image. The light emitting apparatus according to the present embodiment thus includes a control unit for reducing the difference in the amount of light between the first and second light emitting elements, and the control unit controls the first and second light emitting elements to reduce the difference in the amount of light between the first and second light emitting elements.

The control unit according to the present embodiment estimates a difference between a drop in the luminance of the first light emitting elements and a drop in the luminance of the second light emitting elements based on the voltages applied to the respective light emitting elements in passing a certain current through the light emitting elements. The control unit may immediately execute control to reduce the difference in the amount of light between the first and second light emitting elements if a difference between the voltages measured of the first and second light emitting elements exceeds an error range. Alternatively, the control unit may execute control to reduce the difference in the amount of light between the first and second light emitting elements if the difference between the voltages measured of the first and second light emitting elements exceeds a specific difference. In the case of executing control to reduce the difference in the amount of light if the difference between the voltages measured of the first and second light emitting elements exceeds the specific difference, the difference in the amount of light is constantly controlled to be reduced in the subsequent light emission. If a further difference in the amount of light appears even with the control to reduce the difference in the amount of light, control to reduce the difference in the amount of light may be executed again.

In the present embodiment, the relationship between the currents and the voltages in estimating the degradation of the first and second light emitting elements may be reversed. Specifically, a certain voltage may be applied to the first and second light emitting elements, and the degradation may be estimated from the values of the currents passing through the respective light emitting elements.

According to the present embodiment, the degradation of the first and second light emitting elements can be estimated by the control unit passing a certain current through the light emitting elements and measuring the voltages applied to the respective light emitting elements. Alternatively, the degradation of the first and second light emitting elements can be estimated by the control unit applying a certain voltage to the light emitting elements and measuring the currents passing through the respective light emitting elements.

In a second embodiment, a control unit that reduces a difference in the amount of light between first and second light emitting elements includes light receiving elements. The control unit measures the luminance of the first light emitting elements and that of the second light emitting elements, and reduces the difference between the amount of light emitted by the first light emitting elements and that by the second light emitting elements based on measurements. In other words, degradation of the first and second light emitting elements is estimated by a method different from that of the first embodiment.

A light receiving element may transmit a signal obtained by receiving the light emitted from the first light emitting elements to a circuit that generates an image signal. The circuit that generates an image signal generates an image signal intended for the first light emitting elements based on the signal from the light receiving element. If the first light emitting elements are estimated to be degraded from the signal from the light receiving element, the amplitude of the image signal intended for the first light emitting elements is set to be larger. In other words, the first light emitting elements are made to be brighter. Making the first light emitting elements brighter may include making an amount of luminance larger. Alternatively, if the first light emitting elements are estimated to be degraded from the signal from the light receiving element, the first light emitting elements may be controlled to emit light longer.

Alternatively, a signal from a light receiving element may be delivered to a transistor connected to the first or second light emitting element to increase or decrease the luminance of the first light emitting elements or that of the second light emitting elements.

The control to reduce the difference in the amount of light may be immediately executed if a difference in the luminance of light received by the light receiving elements exceeds an error range. Alternatively, the control to reduce the difference in the amount of light emission may be executed if the difference in the luminance of light received by the light receiving elements reaches or exceeds a certain level.

In a third embodiment, a control unit that reduces a difference in the amount of light between first and second light emitting elements includes a unit for measuring a total emission time of the first light emitting elements and a unit for measuring a total emission time of the second light emitting elements. The control unit measures the total emission time of the first light emitting elements and the total emission time of the second light emitting elements, and reduces the difference between the amount of light emitted by the first light emitting elements and the amount of light emitted by the second light emitting elements based on measurements.

In other words, degradation of the first and second light emitting elements is estimated by a method different from that of the first embodiment.

The control unit that reduces the difference in the amount of light between the first and second light emitting elements according to the present embodiment compares the total emission times of the first and second light emitting elements. The control unit reduces the difference in the amount of light emission between the first and second light emitting elements if the difference reaches or exceeds a certain level. The total emission time may be measured of either the first light emitting elements or the second light emitting elements. If the total emission time of either the first light emitting elements or the second light emitting elements is measured and the total emission time of the first light emitting elements or the second light emitting elements measured reaches or exceeds a certain level, the control unit determines that a difference in degradation reaches or exceeds a certain level, and reduces the difference in the amount of light between the first and second light emitting elements.

In a case where the degradation is estimated based on a difference in the total emission time, the control unit may determine the degree of degradation using a table for estimating the degree of degradation from the difference in the total emission time. The table preliminarily indicates a relationship between the total emission time and the degree of degradation. The table may be stored in a memory connected to the light emitting apparatus. The connection to the light emitting apparatus may be wired or wireless.

A light emitting apparatus according to a fourth embodiment may have a third emission mode where only second light emitting elements emit light and first light emitting elements do not. If a difference between the total emission time of the first light emitting elements and that of the second light emitting elements is large, the difference may be reduced by emission in the third emission mode that provides display using only the second light emitting elements without the first light emitting elements emitting light. In the case of a foldable display apparatus, continuing the state where the first light emitting elements on the front surface emit light increases the difference in the total emission time from the second light emitting elements on the backside. Thus, regular use of the third emission mode, where only the second light emitting elements on the backside emit light, can reduce the difference in the total emission time between the first and second light emitting elements. The third emission mode may be used by the user's intention.

A control unit of the light emitting apparatus according to the present embodiment may include a recommendation unit that provides display for recommending the user using the light emitting apparatus in the third emission mode based on the difference between the amount of light of the second light emitting elements and that of the first light emitting elements. The recommendation unit can prompt the user to use the light emitting apparatus in the third emission mode via a display unit.

The control unit that reduces the difference in the amount of light between the first and second light emitting elements according to the present embodiment may be a unit that, in the second emission mode, adjusts luminance to that of either the first light emitting elements or the second light emitting elements based on an image displayed on the second light emitting region. In such a case, the control unit either reduces the amount of light emitted by the second light emitting elements to adjust the amount of light emitted by the second light emitting elements to that by the first light emitting elements, or increases the amount of light emitted by the first light emitting elements to adjust the amount of light emitted by the first light emitting element to that by the second light emitting elements. The control unit may include a determination unit that determines which to adjust. In other words, the control unit may include a determination unit that, in the second emission mode, determines whether to bring the amount of light of the second light emitting region close to the amount of light of the first light emitting elements or the amount of light of the second light emitting elements based on the image displayed on the second light emitting region.

The determination unit can determine, in the second emission mode, whether to adjust the amount of light to that of the second light emitting elements or that of the first light emitting elements depending on whether a large amount of light emission is necessary for the image to be displayed. For example, a large amount of light emission is necessary for the image to be displayed if the image includes a lot of white or yellow areas. On the other hand, the amount of light emission may be small if the image includes a lot of black or blue areas. Whether the image includes a lot of areas in such colors may be determined based on ratios of the areas to the image.

The light emitting apparatus according to the present embodiment may include a selection instruction unit for the user to, in the second emission mode, select whether to bring the amount of light of the second light emitting region close to that of the first light emitting elements or that of the second light emitting elements based on the image displayed on the second light emitting region. The user may be allowed to make the selection while the control unit of the light emitting apparatus can determine whether to bring the amount of light to that of the first light emitting elements or that of the second light emitting elements as described above. The user can view whether the control unit has determined to bring the amount of light close to that of the first light emitting elements or that of the second light emitting elements, and issue an instruction to bring the amount of light close to that of which light emitting elements in consideration of the determination.

Figure 2A:
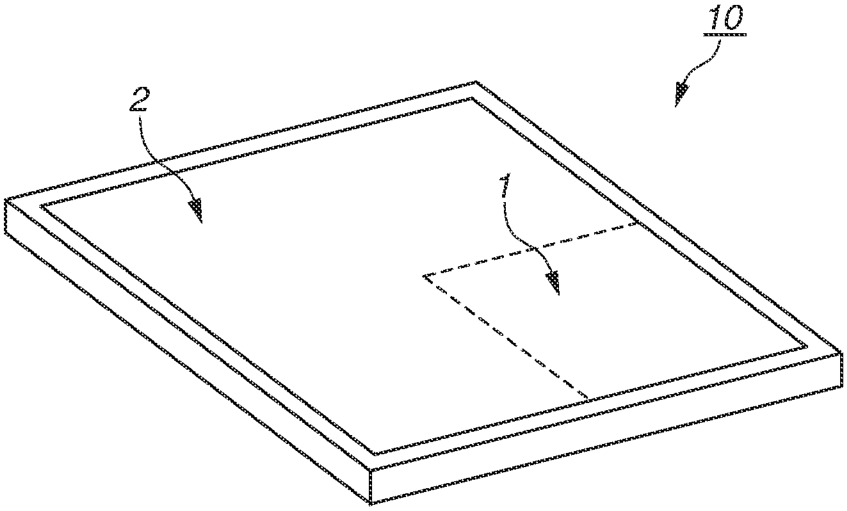
FIG. 2A is a schematic diagram illustrating an example of a first emission mode of a light emitting apparatus according to another embodiment of the present invention.
Figure 2B:
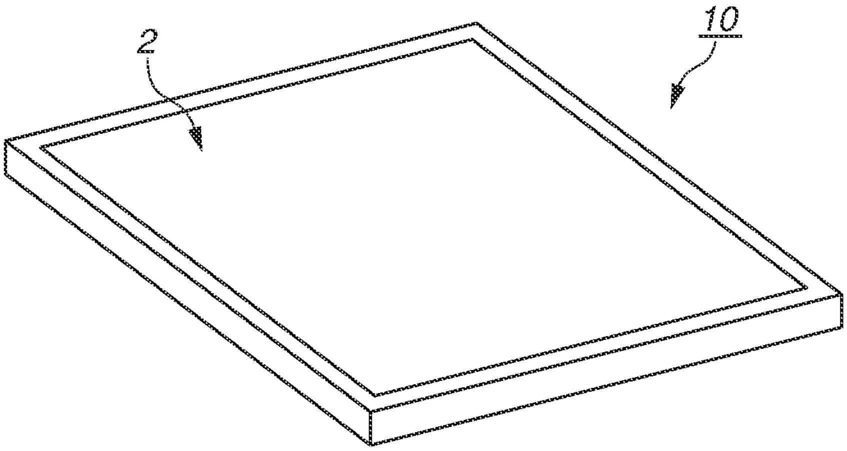
FIG. 2B is a schematic diagram illustrating an example of a second emission mode of the light emitting apparatus according to the other embodiment of the present invention.

FIGS. 2A and 2B illustrate the light emitting apparatus according to the other embodiment of the present invention. The light emitting apparatus illustrated in FIG. 2A is in the first emission mode where only a part of the light emitting apparatus emits light. A difference from FIGS. 1A and 1B is that the light emitting apparatus does not have a folding mechanism. A light emitting apparatus according to an embodiment of the present invention is not limited to a foldable display apparatus and may be configured to only change its light emitting region without changing form as illustrated in FIGS. 2A and 2B.

FIG. 2B illustrates the light emitting apparatus in a second emission mode where both the first and second light emitting elements provide display. The light emitting apparatus executes control to reduce a difference in the amount of light between the first and second light emitting elements as with FIGS. 1A and 1B. Display for recommending a third emission mode may also be provided in the embodiment of FIGS. 2A and 2B.

Other Embodiment

A light emitting apparatus according to an embodiment of the present invention may be a mobile phone including a microphone for detecting sounds and a speaker for emitting sounds. A plurality of microphones and a plurality of speakers may be provided, and a first light emitting region and a region of a second light emitting region other than the first light emitting region may each include at least one of the speakers and at least one of the microphones. A light emitting apparatus according to an embodiment of the present invention may be used for a display screen of software such as application. A light emitting apparatus according to an embodiment of the present invention may display whether to be used in a first emission mode or a second emission mode based on an application to be executed. A light emitting apparatus according to an embodiment of the present invention may include a determination unit that determines whether to display the software such as an application in the first emission mode or the second emission mode. A light emitting apparatus according to an embodiment of the present invention can receive registration of a dominant hand of a user.

The embodiments described in this specification may be used in combination.

[Configuration of Organic Light Emitting Element]

The organic light emitting element is provided by forming an insulating layer, a first electrode, an organic compound layer, and a second electrode on a substrate. A protective layer, a color filter, and/or a microlens array may be disposed on the organic light emitting element.

If the color filter is disposed, a planarization layer may be disposed between the color filter and the protective layer. The planarization layer can be made of an acrylic resin. The same applies if a planarization layer is disposed between the color filter and the microlens array.

[Substrate]

Examples of the substrate include a quartz substrate, a glass substrate, a silicon wafer, a resin substrate, and a metal substrate. Switching elements, such as a transistor, and wiring are disposed on the substrate. An insulating layer may be disposed thereon. The insulating layer may be made of any material as long as contact holes can be formed to form wiring with the first electrodes and insulation from wiring not to be connected can be provided. Examples of the usable material include resins such as polyimide resin, as well as silicon oxide and silicon nitride.

[Electrodes]

A pair of electrodes can be used as the electrodes. The pair of electrodes may be an anode and a cathode.

If an electric field is applied in a direction of causing the organic light emitting element to emit light, an electrode of higher potential is an anode, and the other is a cathode. The electrode that supplies holes to a light emitting layer can be said to be the anode, and the electrode that supplies electrons can be said to be the cathode.

The anode is desirably made of a material having as high a work function as possible. Examples of the usable material include single metals such as gold, platinum, silver, copper, nickel, palladium, cobalt, selenium, vanadium, and tungsten, mixtures including the same, alloys combining the same, and metal oxides such as tin oxide, zinc oxide, indium oxide, indium tin oxide (ITO), and indium zinc oxide. Conductive polymers such as polyaniline, polypyrrole, and polythiophene can also be used.

One of such electrode materials may be singly used. Two or more types may be used in combination. The anode may be single-layered or multilayered.

If the anode is used as a reflecting electrode, materials such as chromium, aluminum, silver, titanium, tungsten, and molybdenum, and alloys and laminates thereof can be used. These materials can also be used to form a reflecting film without an electrode function. If the anode is used as a transparent electrode, transparent conductive oxide layers such as an ITO layer and an indium zinc oxide layer can be used. However, these are not restrictive.

The anode can be formed using a photolithography technique.

Meanwhile, the cathode is desirably made of a material having a low work function. Examples of the usable material include alkali metals such as lithium, alkaline earth metals such as calcium, single metals such as aluminum, titanium, manganese, silver, lead, and chromium, and mixtures including the same. Alloys combining these single metals can also be used. Examples of the usable alloys include magnesium-silver, aluminum-lithium, aluminum-magnesium, silver-copper, and zinc-silver. Metal oxides such as ITO can also be used. One of such electrode materials may be singly used. Two or more types maybe used in combination. The cathode may be single-layered or multilayered. Of the foregoing materials, silver is desirably used. To reduce silver aggregates, a silver alloy is more desirably used. Components of the alloy are not limited in ratio as long as silver aggregates can be reduced. For example, silver can be alloyed with another metal at 1:1 or 3:1.

The cathode is not limited to any specific configuration. An ITO or other conductive oxide layer may be used to constitute a top emission element. An aluminum (Al) or other reflecting electrode may be used to constitute a bottom emission element. The method for forming the cathode is not limited in particular. Direct-current or alternating-current sputtering can desirably be used for favorable film coverage and low resistance.

[Pixel Isolation Layer]

A pixel isolation layer is made of a silicon nitride (SiN) film, a silicon oxynitride (SiON) film, or a silicon oxide (SiO) film formed by chemical vapor deposition (CVD).

To increase the in-plane resistance of the organic compound layer(s), the organic compound layer(s), or a hole transport layer in particular, is/are desirably thinly deposited on the sidewalls of the pixel isolation layer. Specifically, the organic compound layer(s) can be thinly deposited on the sidewalls of the pixel isolation layer as a result of the taper angle of the sidewalls of the pixel isolation layer or the thickness of the pixel isolation layer being increased to increase occlusion during deposition.

Meanwhile, the pixel isolation layer is desirably adjusted in the sidewall taper angle and the thickness to prevent formation of voids in a protective layer formed thereon. The absence of voids in the protective layer can reduce occurrence of defects in the protective layer. Since the occurrence of defects in the protective layer is reduced, a drop in reliability due to occurrence of a dark spot or occurrence of a conduction failure of the second electrodes can be reduced.

According to the present embodiment, a leakage of charge to adjacent pixels can be effectively reduced even if the sidewalls of the pixel isolation layer do not have a steep taper angle. As a result of the study, it has been found that the leakage of charge can be sufficiently reduced if the taper angle is in a range of 60° or more and not more than 90°. A desirable thickness of the pixel isolation layer is 10 nm or more and not more than 150 nm. Similar effects can be obtained by a configuration with only the pixel electrodes without the pixel isolation layer. In such a case, however, it is desirable that the thickness of the pixel electrodes be reduced to one half of the thickness of the organic layer(s) or less or the ends of the pixel electrodes be tapered forward at less than 60° for the sake of reduction of a short-circuit between the organic light emitting elements.

If the first electrodes are cathodes and the second electrodes are anodes, a high color range and low voltage driving can be implemented by forming of the light emitting layer on the electron transport layer.

[Organic Compound Layer(s)]

The organic light emitting elements may include a single organic compound layer or a plurality of organic compound layers. In the case of the plurality of layers, the layers may be referred to as a hole injection layer, a hole transport layer, an electron blocking layer, a light emitting layer, a hole blocking layer, an electron transport layer, and/or an electron injection layer depending on the respective functions. The organic compound layer(s) is/are formed mainly of an organic compound or compounds, but may contain inorganic atoms and inorganic compounds. For example, copper, lithium, magnesium, aluminum, iridium, platinum, molybdenum, and/or zinc may be included. The organic compound layer(s) may be located between the first and second electrodes or in contact with the first and second electrodes.

[Protective Layer]

A protective layer may be formed over the second electrodes. For example, a glass plate accompanied with a moisture absorbent can be bonded to the second electrodes to reduce intrusion of water into the organic compound layer(s) and reduce occurrence of display failures. In another embodiment, a silicon nitride passivation film may be disposed on the cathodes to reduce intrusion of water into the organic compound layer(s). For example, after the formation of the cathodes, the article may be transported into another chamber without breaking of the vacuum, and a 2-μm-thick silicon nitride film may be formed as the protective layer by CVD. After the CVD deposition, a protective layer may be formed by atomic layer deposition (ALD). The material of the ALD film is not limited in particular, and may be silicon nitride, silicon oxide, or aluminum oxide. Silicon nitride may be further deposited on the ADL film by CVD. The ADL film may have a smaller thickness than that of the CVD film. Specifically, the ADL film may have the thickness less than or equal to 50%, or less than or equal to 10%, of the thickness of the CVD film.

[Color Filter]

A color filter may be disposed on the protective layer. For example, a color filter with consideration given to the size of the organic light emitting elements may be disposed on another substrate, and laminated with the substrate on which the organic light emitting elements are disposed. The color filter may be patterned on the foregoing protective layer by a photolithographic technique. The color filter may be made of polymer.

[Planarization Layer]

A planarization layer may be disposed between the color filter and the protective layer. The planarization layer is provided for the purpose of reducing irregularities of the layers below. Without limiting the purpose, the planarization layer may be referred to as a material resin layer. The planarization layer may be made of an organic compound that may be monomer or polymer. A polymeric planarization layer may be desirable.

Planarization layers may be disposed on and under the color filter. Such planarization layers may be made of the same or different materials. Specific examples of the materials include a polyvinylcarbazole resin, a polycarbonate resin, a polyester resin, an acrylonitrile butadiene styrene (ABS) resin, an acrylic resin, a polyimide resin, a phenol resin, an epoxy resin, a silicone resin, and a urea resin.

[Microlens Array]

The light emitting apparatus may include an optical member such as a microlens array on a light emission side. The microlens array can be made of an acrylic resin or an epoxy resin. The microlens array may be intended to increase the amount of light taken out of the light emitting apparatus or control the direction of the output light beam. Each microlens may have a hemispherical shape. If the microlens has a hemispherical shape, there is a tangential line parallel to the insulating layer among the tangential lines to the hemisphere, and the point of contact between the tangential line and the hemisphere is the vertex of the microlens. The vertex of the microlens can be similarly determined in a given cross-sectional view. Specifically, there is a tangential line parallel to the insulating layer among the tangential lines to the semicircle of the microlens in the cross-sectional view, and the point of contact between the tangential line and the semicircle is the vertex of the microlens.

A midpoint of the microlens can also be defined. In a cross section of the microlens array, assume a line segment from a point where a circular arc shape ends to a point where another circular arc shape ends. The midpoint of the line segment can be referred to as the midpoint of the microlens. The cross section where the vertex and the midpoint are determined may be one cross section perpendicular to the insulating layer.

A microlens has a first surface including the convex portions, and a second surface opposite the first surface. The second surface is desirably located closer to the functional layer(s) than the first surface is. For such a configuration, the microlens array is desirably formed on the light emitting apparatus. If the functional layer(s) is/are an organic layer or layers, a high-temperature process is desirably avoided during a manufacturing process. If the second surface is located closer to the functional layer(s) than the first surface is, all the organic compounds constituting the organic layer(s) desirably have a glass transition temperature of 100° C. or higher, and more desirably 130° C. or higher.

[Counter Substrate]

A counter substrate may be disposed on the planarization layer. The counter substrate is so called because it is located at a position opposite to the foregoing substrate. The counter substrate may be made of the same material as that of the foregoing substrate. With the foregoing substrate as a first substrate, the counter substrate may be a second substrate.

[Organic Compound Layer(s)]

The organic compound layer(s) constituting the organic light emitting element according to the embodiment of the present invention (hole injection layer, hole transport layer, the electron blocking layer, light emitting layer, hole blocking layer, electron transport layer, and/or election injection layer) is/are formed by the following method.

The organic compound layer(s) constituting the organic light emitting elements according to the embodiment of the present invention can be formed by dry processes such as vacuum deposition, ionized deposition, sputtering, and plasma CVD. Instead of the dry processes, wet processes of forming a layer by using organic materials dissolved in an appropriate solvent and applying the solution by known application methods (such as spin coating, dipping, casting, the Langmuir-Blodgett (LB) method, and inkjet printing) can be used.

Layers formed by vacuum deposition or solution application are less prone to crystallization and have excellent stability over time. The solution application can form a film in combination with an appropriate binder resin.

Examples of the binder resin include, but not limited to, a polyvinylcarbazole resin, a polycarbonate resin, a polyester resin, an ABS resin, an acrylic resin, a polyimide resin, a phenol resin, an epoxy resin, a silicone resin, and a urea resin.

Each of such binder resins may be singly used as a homopolymer or copolymer. Two or more types may be used in combination. Known additives such as a plasticizer, an antioxidant, and an ultraviolet absorber may also be used in combination as appropriate.

[Pixel Circuits]

The light emitting apparatus may include pixel circuits connected to the light emitting elements. The pixel circuits may be active matrix circuits that control light emission of the first and second light emitting elements separately. The active matrix circuits may be voltage programming circuits or current programming circuits. The driving circuit includes pixel circuits for the respective pixels. The pixel circuits may each include a transistor for controlling the emission luminance of the light emitting element, a transistor for controlling emission timing, a capacitor for retaining the gate voltage of the transistor that controls the emission luminance, and a transistor for bypassing the light emitting element for ground (GND) connection.

The light emitting apparatus includes a display region, and a peripheral region around the display region. The display region includes the pixel circuits, and the peripheral region includes a display control circuit. The transistors constituting the pixel circuits may have mobility lower than mobility of the transistors constituting the display control circuit.

The transistors constituting the pixel circuits are not limited to ones using a single crystal silicon wafer, and may be thin-film transistors each having an active layer on an insulating surface of the substrate. Examples of the material of the active layer include single crystal silicon, non-single crystal silicon such as amorphous silicon and microcrystalline silicon, and non-single crystal oxide semiconductors such as indium zinc oxide and indium gallium zinc oxide. Thin-film transistors may also be referred to as thin-film transistor (TFT) elements.

The transistors constituting the pixel circuits may have a current-voltage characteristic with a smaller gradient than that of the current-voltage characteristic of the transistors constituting the display control circuit. The gradient of the current-voltage characteristic can be measured based on a Vg-Ig characteristic.

The transistors constituting the pixel circuits refer to ones connected to the light emitting elements such as the first light emitting elements.

[Pixels]

The light emitting apparatus includes a plurality of pixels. Each pixel includes subpixels that emit light in respective different colors. For example, the subpixels may emit light in red, green, and blue (RGB).

A pixel emits light from an area called a pixel aperture. The pixel aperture may be less than or equal to 15 μm and greater than or equal to 5 μm in size. More specifically, the size may be 11 μm, 9.5 μm, 7.4 μm, or 6.4 μm.

The pitch between the subpixels may be 10 μm or less. Specifically, the pitch may be 8 μm, 7.4 μm, or 6.4 μm.

In a plan view, the pixels can be arranged in a conventional arrangement. Examples include a stripe arrangement, a delta arrangement, a PenTile arrangement, and a Bayer arrangement. In the plan view, the subpixels may have any conventional shape. Examples include quadrangles such as a rectangle and a rhombus, and a hexagon. It will be understood that a rectangle is not limited to ones in a strict sense and may include shapes similar to a rectangle. The subpixel shapes and the pixel arrangement may be used in any appropriate combination.

[Application of Display Apparatus According to Embodiment of Present Invention]

The organic light emitting elements according to the embodiment of the present invention can be used as components of a display apparatus or an illumination apparatus. Other applications may include an exposure light source of an electrophotographic image forming apparatus, a backlight of a liquid crystal display apparatus, and a light emitting apparatus including a color filter on a white light source.

The display apparatus may be an image information processing apparatus that includes an image input unit to which image information from an area charge-coupled device (CCD) image sensor, a linear CCD image sensor, or a memory card is input, and an information processing unit for processing the input information, and displays the input image information on a display unit.

The display unit of an imaging apparatus or an inkjet printer may have a touchscreen function. The driving method of the touchscreen function is not limited in particular, and an infrared, capacitive, resistive, or electromagnetic induction driving method may be used. The display apparatus may be used as a display unit of a multifunction printer.

Figure 3:
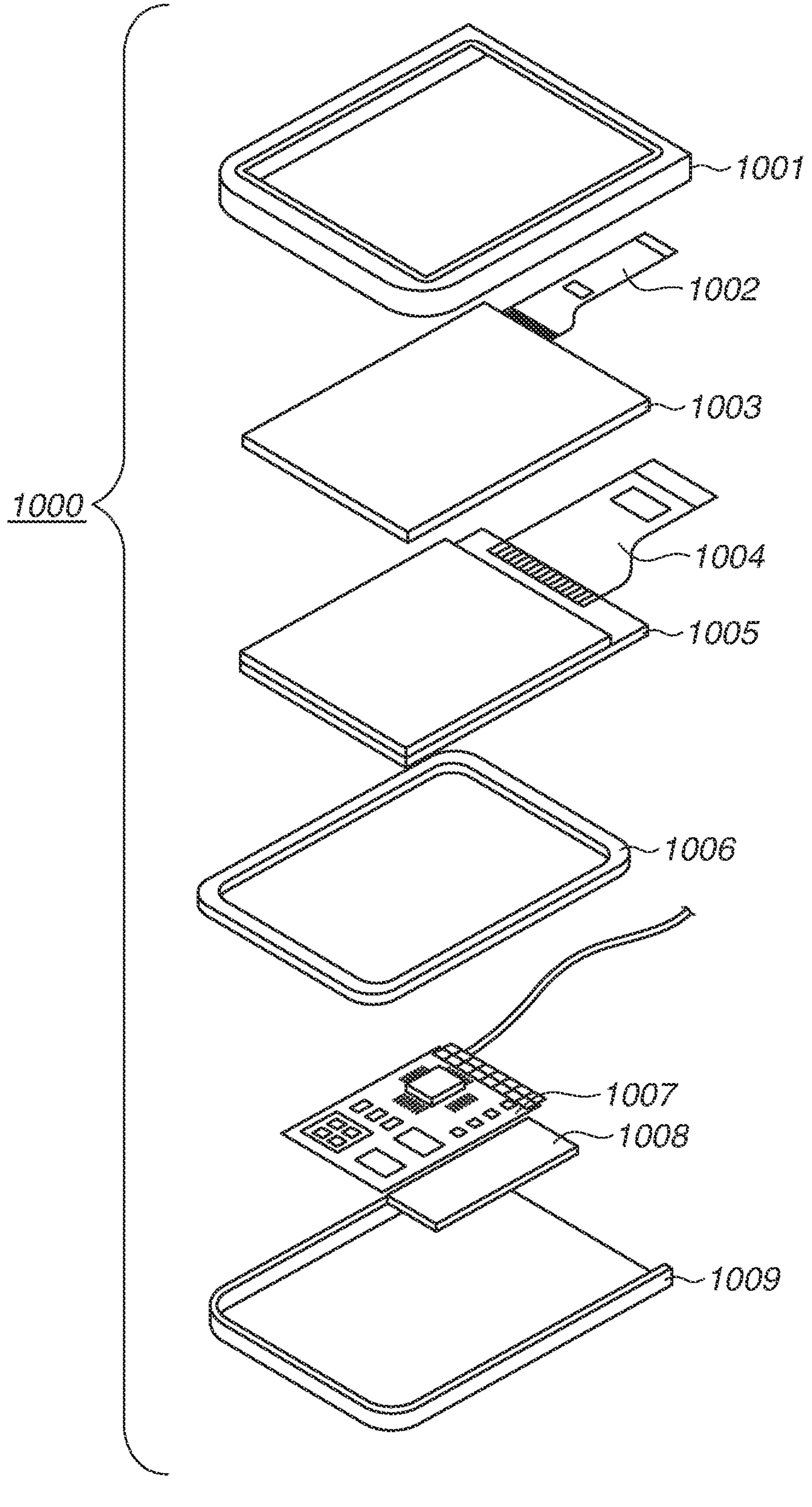
FIG. 3 is a schematic diagram illustrating an example of a display apparatus according to an embodiment of the present invention.

FIG. 3 is a schematic diagram illustrating an example of the display apparatus according to the present embodiment. A display apparatus 1000 may include a touchscreen 1003, a display panel 1005, a frame 1006, a circuit board 1007, and a battery 1008 between an upper cover 1001 and a lower cover 1009. Flexible printed circuits (FPCs) 1002 and 1004 are connected to the touchscreen 1003 and the display panel 1005, respectively. Transistors are printed on the circuit board 1007. If the display apparatus 1000 is not a portable device, the battery 1008 does not need to be included. The battery 1008 may be located at a different position even if the display apparatus 1000 is a portable device. The display panel 1005 can be extended to extend the display region.

The display apparatus according to the present embodiment may include an RGB color filter. The color filter may be in an RGB delta arrangement.

The display apparatus according to the present embodiment may be used for a display unit of a portable terminal. In such a case, the display apparatus may have both a display function and an operation function. Examples of the portable terminal include a mobile phone such as a smartphone, a tablet, and a head-mounted display.

The display apparatus according to the present embodiment may be used for a display unit of an imaging apparatus that includes an optical unit including a plurality of lenses, and an image sensor for receiving light passed through the optical unit. The imaging apparatus may include the display unit that displays information obtained by the image sensor. The display unit may be one exposed to outside of the imaging apparatus or one located inside a viewfinder. The imaging apparatus may be a digital camera or a digital video camera.

Figure 4A:
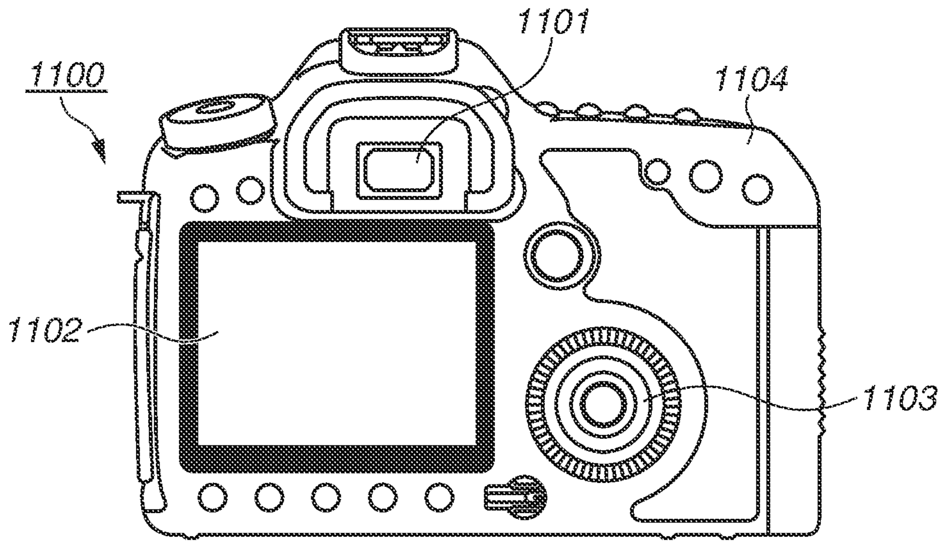
FIG. 4A is a schematic diagram illustrating an example of an imaging apparatus according to an embodiment of the present invention.

FIG. 4A is a schematic diagram illustrating an example of an imaging apparatus according to the present embodiment. An imaging apparatus 1100 may include a viewfinder 1101, a rear display 1102, an operation unit 1103, and a housing 1104. The viewfinder 1101 may include the display apparatus according to the present embodiment. In such a case, the display apparatus may display not only an image to be captured but also environment information and an imaging instruction as well. The environment information may include the intensity of external light, the direction of the external light, the moving speed of an object, and/or the possibility of the object being shielded behind a shielding object.

While FIG. 4A illustrates a fixed screen, the screen of the display apparatus according to the present embodiment can be extended. The illustrated state corresponds to a first display region, and the extended state corresponds to a second display region.

Information is desirably displayed as quickly as possible since imaging opportunity lasts only a few moments. The use of the display apparatus using the organic light emitting elements according to the present embodiment is therefore desirable. The reason is that organic light emitting elements have high response speed. The display apparatus using organic light emitting elements can be used more suitably for such apparatuses with high display speed than a liquid crystal display.

The imaging apparatus 1100 includes a not-illustrated optical unit. The optical unit includes a plurality of lenses, and forms an image on an image sensor accommodated in the housing 1104. The plurality of lenses can adjust the focus by adjusting their relative positions. Such an operation can be automatically performed. The imaging apparatus may be referred to as a photoelectric conversion apparatus. Instead of sequential imaging, the photoelectric conversion apparatus may include, as imaging methods, a method of detecting a difference from a previous image and a method of cutting out a part of a constantly recorded image.

Figure 4B:
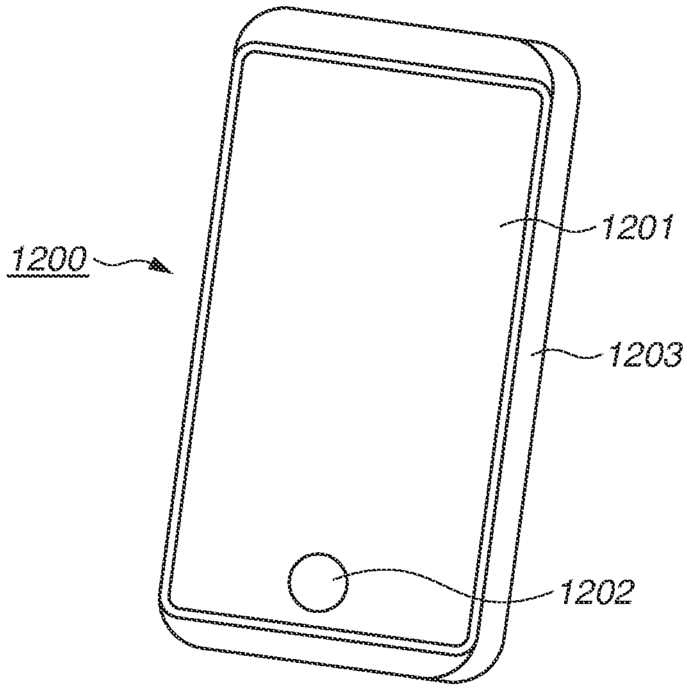
FIG. 4B is a schematic diagram illustrating an example of an electronic device according to an embodiment of the present invention.

FIG. 4B is a schematic diagram illustrating an example of an electronic device according to the present embodiment. An electronic device 1200 includes a display unit 1201, an operation unit 1202, and a housing 1203. The housing 1203 may include a circuit, a printed circuit board including the circuit, a battery, and a communication unit. The operation unit 1202 may be a button or an active part of a touchscreen. The operation unit 1202 may be a biometric unit that recognizes a fingerprint and executes unlocking. The electronic device 1200 including the communication unit can also be referred to as a communication device. The electronic device 1200 may include a lens and an image sensor and thereby have a camera function as well. An image captured by the camera function is displayed on the display unit. Examples of the electronic device 1200 include a smartphone and a laptop personal computer.

Figure 5A:
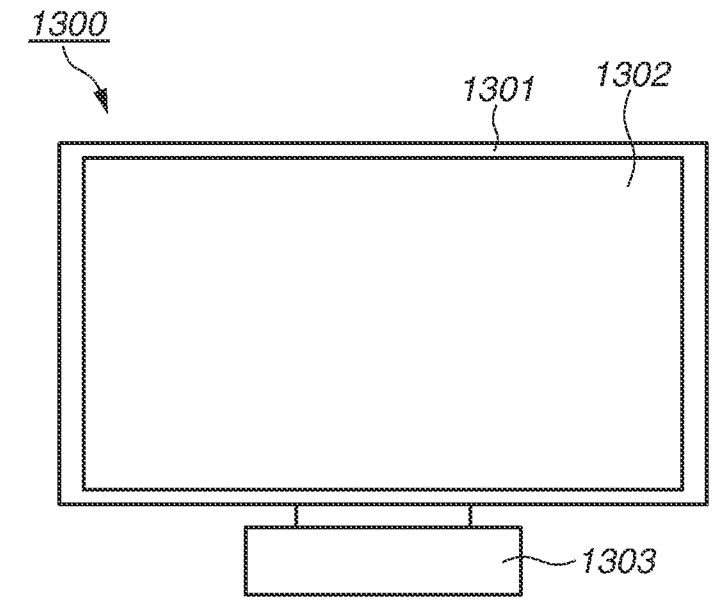
FIG. 5A is a schematic diagram illustrating an example of a display apparatus according to an embodiment of the present invention.
Figure 5B:
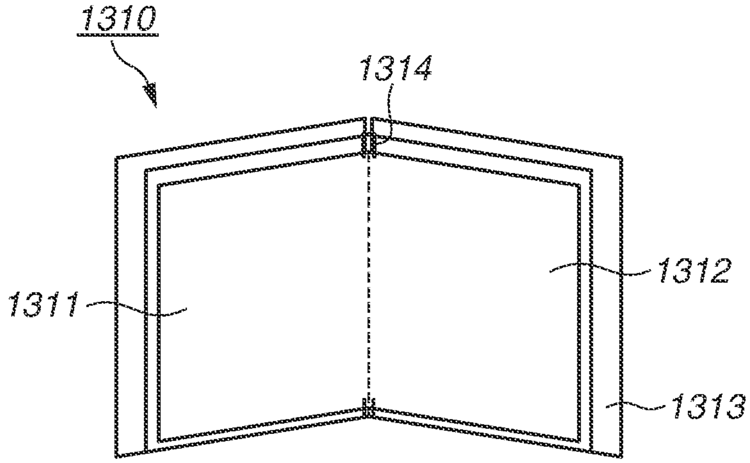
FIG. 5B is a schematic diagram illustrating an example of a foldable display apparatus.

FIGS. 5A and 5B are schematic diagrams illustrating examples of the display apparatus according to the present embodiment. FIG. 5A illustrates a display apparatus such as a television monitor and a personal computer (PC) monitor. A display apparatus 1300 includes a frame 1301 and a display unit 1302. The light emitting apparatus according to the present embodiment may be used for the display unit 1302.

The display apparatus 1300 also includes a base 1303 that supports the frame 1301 and the display unit 1302. The base 1303 is not limited to the form illustrated in FIG. 4A. The bottom side of the frame 1301 may serve as a base.

The frame 1301 and the display unit 1302 may be curved. The radius of curvature may be greater than or equal to 5000 mm and less than or equal to 6000 mm.

FIG. 5B is a schematic diagram illustrating another example of the display apparatus according to the present embodiment. A display apparatus 1310 of FIG. 5B is a foldable display apparatus configured to be foldable. The display apparatus 1310 includes a first display unit 1311, a second display unit 1312, a housing 1313, and a bending point 1314. The first and second display units 1311 and 1312 may include organic light emitting elements according to the present embodiment. The first and second display units 1311 and 1312 may be a seamless display apparatus. The first and second display units 1311 and 1312 can be divided at the bending point 1314. The first and second display units 1311 and 1312 may display respective different images or a single image.

Figure 6A:
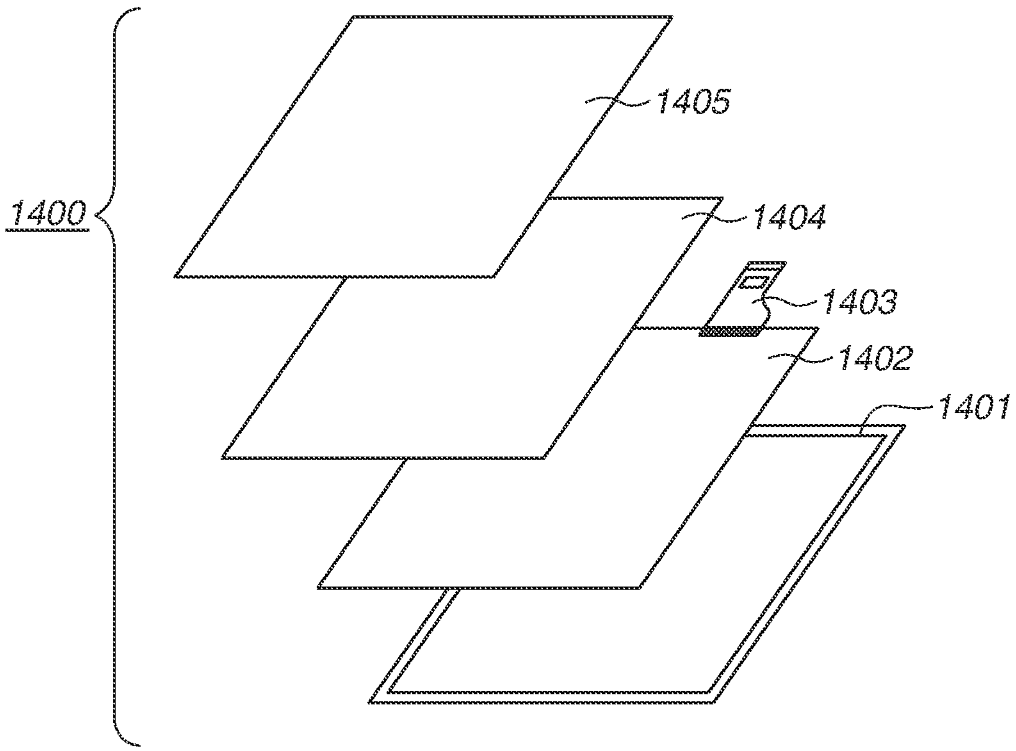
FIG. 6A is a schematic diagram illustrating an example of an illumination apparatus according to an embodiment of the present invention.

FIG. 6A is a schematic diagram illustrating an example of an illumination apparatus according to the present embodiment. An illumination apparatus 1400 may include a housing 1401, a light source 1402, a circuit board 1403, an optical film 1404, and a light diffusion unit 1405. The light source 1402 may include organic light emitting elements according to the present embodiment. The optical film 1404 may be a film for improving the color rendering properties of the light source 1402. The light diffusion unit 1405 can effectively diffuse the light from the light source 1402 and deliver the light to a wide range for illumination purposes. The optical film 1404 and the light diffusion unit 1405 may be disposed on the light emission side of the illumination apparatus 1400. A cover may be disposed on the outermost side as appropriate.

The illumination apparatus 1400 is an apparatus for illuminating a room, for example. The illumination apparatus 1400 may emit light in white, neutral white, or any other color from blue to red. The illumination apparatus 1400 may include a dimmer circuit for adjusting the light.

The illumination apparatus 1400 may include organic light emitting elements according to the present embodiment and a power supply circuit connected thereto. The power supply circuit is a circuit for converting an alternating-current voltage into a direct-current voltage. White refers to a color temperature of 4200 K. Neutral white refers to a color temperature of 5000 K. The illumination apparatus 1400 may include a color filter.

The illumination apparatus 1400 according to the present embodiment may include a heat radiation unit. The heat radiation unit is intended to radiate heat from the inside to the outside of the illumination apparatus 1400. Examples of the material of the heat radiation unit include high specific heat metals and liquid silicon.

Figure 6B:
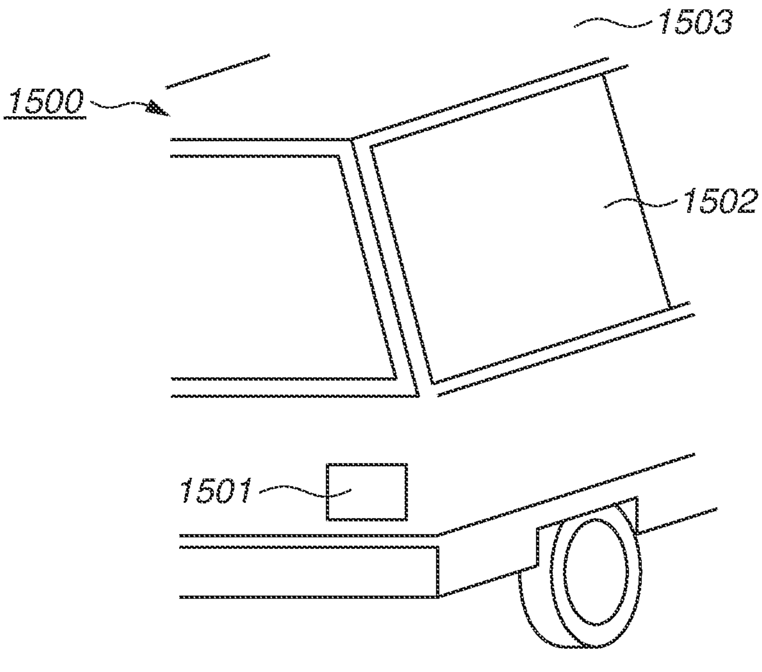
FIG. 6B is a schematic diagram illustrating an example of an automobile including a vehicle lamp according to an embodiment of the present invention.

FIG. 6B is a schematic diagram illustrating an automobile that is an example of a moving body according to the present embodiment. The automobile includes a tail lamp that is an example of a lamp. An automobile 1500 includes the tail lamp 1501. The tail lamp 1501 may be lit when a brake operation is made.

The tail lamp 1501 may include organic light emitting elements according to the present embodiment. The tail lamp 1501 may include a protective member for protecting the organic light emitting elements (organic electroluminescence [EL] elements). The protective member may be made of any transparent material having a considerable strength, desirably made of polycarbonate. A furandicarboxylic acid derivative or an acrylonitrile derivative may be mixed into the polycarbonate.

The automobile 1500 may include a vehicle body 1503 and windows 1502 attached thereto. The windows 1502 other than those for observing the front and rear of the automobile 1500 may be transparent displays. The transparent displays may include organic light emitting elements according to the present embodiment. In such a case, the electrodes and other components of the organic light emitting elements are made of transparent materials.

The moving body according to the present embodiment may be a ship, an aircraft, or a drone. The moving body may include a body and a lamp attached to the body. The lamp may emit light to inform the location of the body. The lamp includes organic light emitting elements according to the present embodiment.

Application examples of the display apparatus according to the foregoing embodiments will be described with reference to FIGS. 7A and 7B. The display apparatus can be applied to systems that can be worn as a wearable device, such as smartglasses, a head-mounted display (HMD), and smart contact lenses. An imaging display apparatus used in such application examples includes an imaging apparatus capable of photoelectrically converting visible light, and a display apparatus capable of emitting visible light.

Figure 7A:
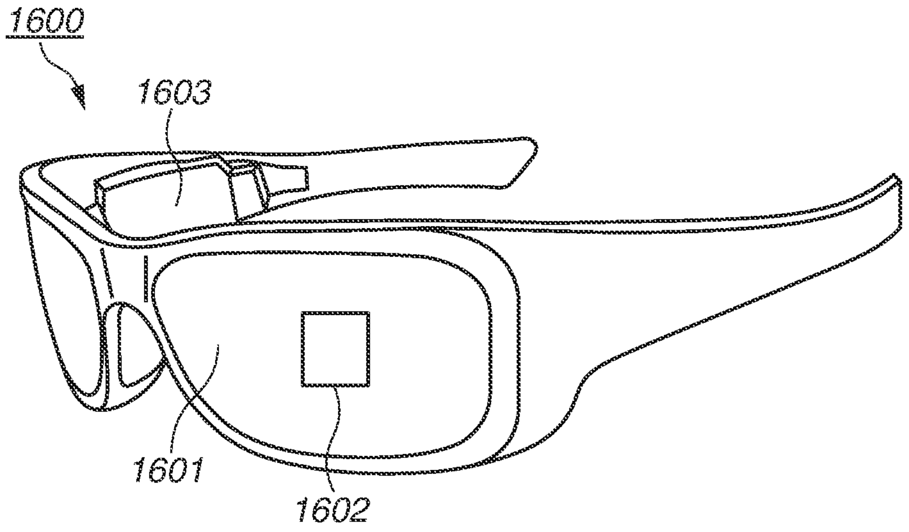
FIG. 7A is a schematic diagram illustrating an example of a wearable device according to an embodiment of the present invention.

FIG. 7A illustrates glasses 1600 (smartglasses) according to an application example. An imaging apparatus 1602, such as a complementary metal-oxide semiconductor (CMOS) sensor and a single-photon avalanche diode (SPAD), is disposed on the front side of a lens 1601 of the glasses 1600. The display apparatus according to one of the foregoing embodiments is disposed on the backside of the lens 1601.

The glasses 1600 further include a control apparatus 1603. The control apparatus 1603 functions as a power supply for supplying power to the imaging apparatus 1602 and the display apparatus according to the embodiment. The control apparatus 1603 also controls operation of the imaging apparatus 1602 and the display apparatus. The lens 1601 includes an optical system for collecting light to the imaging apparatus 1602.

Figure 7B:
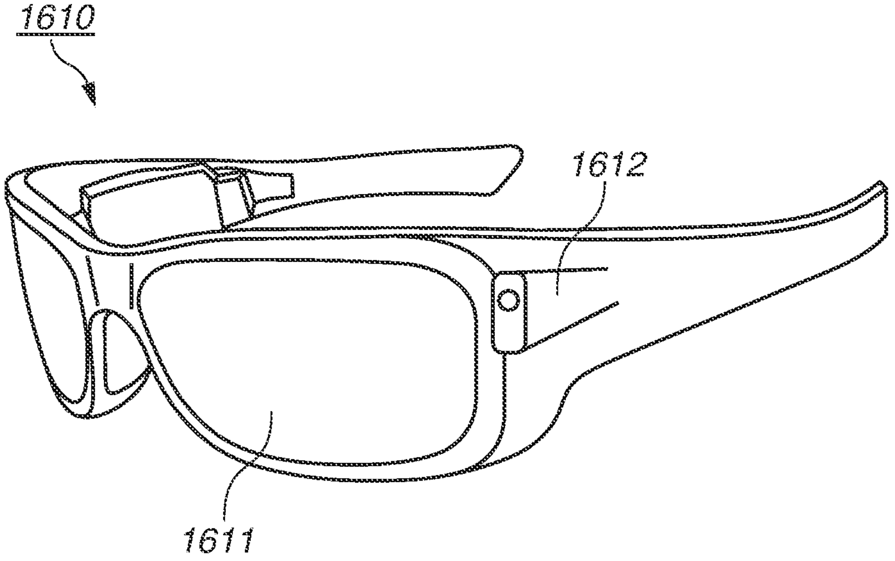
FIG. 7B is a schematic diagram illustrating an example of a wearable device according to an embodiment of the present invention, configured to include an imaging apparatus.

FIG. 7B illustrates glasses 1610 (smartglasses) according to another application example. The glasses 1610 include a control apparatus 1612. The control apparatus 1612 includes an imaging apparatus equivalent to the imaging apparatus 1602 and a display apparatus. A lens 1611 includes an optical system for projecting light emitted from the display apparatus in the control apparatus 1612, and an image is projected on the lens 1611. The control apparatus 1612 functions as a power supply for supplying power to the imaging apparatus and the display apparatus, and controls operation of the imaging apparatus and the display apparatus. The control apparatus 1612 may include a line of sight detection unit for detecting the line of sight of the wearer (user). The line of sight may be detected by use of infrared rays.

An infrared emission unit emits infrared rays toward each eyeball of the user gazing at the displayed image. An imaging unit including a light receiving element detects reflected light of the emitted infrared rays from the eyeball, whereby a captured image of the eyeball is obtained. A reduction unit for reducing light from the infrared emission unit to the display unit in a plan view is included to reduce a drop in image quality.

The user's line of sight to the displayed image is detected from the captured image of the eyeball, obtained by the infrared imaging. Any known technique can be applied to detect the line of sight using the captured image of the eyeball. For example, a line of sight detection method based on a Purkinje image using corneal reflection of illumination light can be used.

More specifically, line of sight detection processing based on a pupil-corneal reflection method is performed. By the pupil-corneal reflection method, a line of sight vector expressing a direction (rotation angle) of the eyeball is calculated based on a pupil image and a Purkinje image included in the captured image of the eyeball, whereby the user's line of sight is detected.

A display apparatus according to an embodiment of the present invention may include an imaging apparatus including a light receiving element, and a displayed image on the display apparatus may be controlled based on user's line of sight information from the imaging apparatus.

Specifically, the display apparatus determines a first field of view region at which the user gazes and a second field of view region other than the first field of view region based on the line of sight information. The first and second field of view regions may be determined by a control apparatus of the display apparatus. The display apparatus may receive first and second field of view regions determined by an external control apparatus. A display region of the display apparatus may be controlled so that the first field of view region has higher display resolution than that of the second field of view region. In other words, the resolution of the second field of view region may be made lower than that of the first field of view region.

The display region includes a first display region and a second display region different from the first display region, and which of the regions is to have higher priority, the first display region or the second display region, is determined based on the line of sight information. The region of the higher priority may be determined by the control apparatus of the display apparatus. The display apparatus may receive a region of the higher priority determined by an external control apparatus. The region of the higher priority may be controlled to have higher resolution than that of a region other than the region of the higher priority. In other words, the region of relatively low priority may be reduced in resolution.

The first field of view region or the region of the higher priority may be determined by use of artificial intelligence (AI). The AI may be a model configured to estimate the angle of the line of sight and/or the distance to a target object in front of the line of sight from the eyeball image, using eyeball images and the actual viewing directions of the eyeballs in the images as training data. An AI program may be included in the display apparatus, the imaging apparatus, or an external apparatus. If the external apparatus includes the AI program, the determination is delivered to the display apparatus by communication.

If display is controlled based on visual detection, the display apparatus can be suitably applied to smartglasses that further include an imaging apparatus for capturing an image outside. Such smartglasses can display captured outside information in real time.

As it has been described above, the use of an apparatus using organic light emitting elements according to the present invention enables display of favorable image quality with stability over a long period of time.

According to an embodiment of the present invention, a light emitting apparatus having a variable light emitting region with a reduced difference in luminance degradation between light emitting regions can be provided.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2022-108938, filed Jul. 6, 2022, and No. 2023-087972, filed May 29, 2023, which are hereby incorporated by reference herein in their entirety.

What is claimed is:

1. A light emitting apparatus having a first light emitting region and a second light emitting region, the second light emitting region including the first light emitting region and having a larger area than that of the first light emitting region, a first light emitting element being included in the first light emitting region, a second light emitting element being not included in the first light emitting region but included in the second light emitting region, the light emitting apparatus having a first emission mode where the first light emitting region emits light and where the second emitting region does not and a second emission mode where the second light emitting region emits light, the light emitting apparatus comprising:

a control unit configured to, in the second emission mode, control a difference between an amount of light emitted by the first light emitting element and an amount of light emitted by the second light emitting element; and a folding mechanism between the first light emitting region and a region of the second light emitting region other than the first light emitting region, wherein the light emitting apparatus has a third emission mode where the second light emitting element emits light and the first light emitting element does not.

2. The light emitting apparatus according to claim 1, wherein the control unit is configured to reduce a difference between the amount of light emitted by the first light emitting element included in the first light emitting region and the amount of light emitted by the second light emitting element not included in the first light emitting region.

3. The light emitting apparatus according to claim 1, further comprising a current measurement unit configured to obtain a first current value when the first light emitting element emits light at first emission luminance and a second current value when the second light emitting element emits light at the first emission luminance, wherein the difference between the amounts of light emitted by the first and second light emitting elements is reduced based on information from the current measurement unit.

4. The light emitting apparatus according to claim 1, further comprising a light receiving unit, wherein the difference between the amounts of light emitted by the first and second light emitting elements is reduced based on information from the light receiving unit.

5. The light emitting apparatus according to claim 4, wherein an image signal is generated based on a signal from the light receiving unit, and the difference between the amounts of light emitted by the first and second light emitting elements is reduced based on the image signal.

6. The light emitting apparatus according to claim 4, wherein a voltage applied to the first light emitting element or the second light emitting element is increased or decreased based on a signal from the light receiving unit.

7. The light emitting apparatus according to claim 1, further comprising time measurement units each configured to measure a cumulative time of light emission, wherein the difference between the amounts of light emitted by the first and second light emitting elements is reduced based on information from the respective time measurement units.

8. The light emitting apparatus according to claim 1, further comprising a detection unit configured to detect orientation of the light emitting apparatus, wherein the first and second emission modes are switched based on a signal from the detection unit.

9. The light emitting apparatus according to claim 1, wherein light emission of the second light emitting region is controlled depending on a state of the folding mechanism.

10. The light emitting apparatus according to claim 1, wherein the folding mechanism is configured to be folded with both the first light emitting region and the region of the second light emitting region other than the first light emitting region facing outside.

11. The light emitting apparatus according to claim 1, further comprising:

a plurality of speakers configured to emit sounds; and a plurality of microphones configured to detect sounds, wherein the first light emitting region and the region of the second light emitting region other than the first light emitting region each include at least one of the speakers and at least one of the microphones.

12. The light emitting apparatus according to claim 1, further comprising a recommendation unit configured to provide display for recommending a user using the light emitting apparatus in the third emission mode based on the difference between the amounts of light emitted by the first and second light emitting elements.

13. The light emitting apparatus according to claim 1, further comprising a determination unit configured to, in the second emission mode, determine whether to bring an amount of light of the second light emitting region close to the amount of light emitted by the first light emitting element or the amount of light emitted by the second light emitting element based on an image displayed on the second light emitting region.

14. The light emitting apparatus according to claim 1, further comprising a selection instruction unit configured to allow a user to, in the second emission mode, select bringing an amount of the second light emitting region close to the amount of light emitted by the first light emitting element or close to the amount of light emitted by the second light emitting element based on an image displayed on the second light emitting region.

15. The light emitting apparatus according to claim 1, wherein the control unit configured to control the difference between the amounts of light emitted by the first and second light emitting elements is configured to increase or decrease luminance of the first light emitting element or luminance of the second light emitting element.

16. The light emitting apparatus according to claim 1, wherein the control unit configured to control the difference between the amounts of light emitted by the first and second light emitting elements is configured to increase or decrease a light emission time of the first light emitting element or a light emission time of the second light emitting element.

17. The light emitting apparatus according to claim 1, further comprising a determination unit configured to determine software to be executed, wherein the determination unit determines whether to display in the first emission mode or the second emission mode based on the software.

18. A display apparatus comprising:

a display unit including the light emitting apparatus according to claim 1; and a display control unit connected to the light emitting apparatus and configured to control display of the display unit.

19. The display apparatus according to claim 18, further comprising a communication unit connected to the display control unit and configured to communicate information with outside.

20. An electronic device comprising:

the light emitting apparatus according to claim 1;

a housing including the light emitting apparatus; and a communication unit included in the housing.

21. A light emitting apparatus having a first light emitting region and a second light emitting region, the second light emitting region including the first light emitting region and having a larger area than that of the first light emitting region, a first light emitting element being included in the first light emitting region, a second light emitting element being not included in the first light emitting region but included in the second light emitting region, the light emitting apparatus having a first emission mode where only the first light emitting region emits light and where the second emitting region does not and a second emission mode where the second light emitting region emits light, the light emitting apparatus comprising:

a control unit configured to, in the second emission mode, control a difference between an amount of light emitted by the first light emitting element and an amount of light emitted by the second light emitting element;

a folding mechanism between the first light emitting region and a region of the second light emitting region other than the first light emitting region, and a plurality of speakers configured to emit sounds; and a plurality of microphones configured to detect sounds, and wherein the first light emitting region and the region of the second light emitting region other than the first light emitting region each include at least one of the speakers and at least one of the microphones.

* * * * *